United States Patent
Liu et al.

(10) Patent No.: US 11,909,489 B2
(45) Date of Patent: Feb. 20, 2024

(54) SYSTEM AND METHOD FOR BEAM MANAGEMENT WITH EMISSIONS LIMITATIONS

(71) Applicant: Huawei Technologies Co., Ltd., Shenzhen (CN)

(72) Inventors: Bin Liu, San Diego, CA (US); Pengfei Xia, San Diego, CA (US); Young Hoon Kwon, Laguna Niguel, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/417,963

(22) PCT Filed: Apr. 29, 2019

(86) PCT No.: PCT/CN2019/084923
§ 371 (c)(1),
(2) Date: Jun. 24, 2021

(87) PCT Pub. No.: WO2020/140353
PCT Pub. Date: Jul. 9, 2020

(65) Prior Publication Data
US 2022/0045734 A1 Feb. 10, 2022

Related U.S. Application Data

(60) Provisional application No. 62/788,345, filed on Jan. 4, 2019.

(51) Int. Cl.
*H04W 16/28* (2009.01)
*H04W 24/10* (2009.01)
*H04W 52/36* (2009.01)
*H04B 7/06* (2006.01)
*H04L 5/00* (2006.01)

(52) U.S. Cl.
CPC ......... *H04B 7/0695* (2013.01); *H04L 5/0051* (2013.01); *H04W 16/28* (2013.01); *H04W 24/10* (2013.01); *H04W 52/367* (2013.01)

(58) Field of Classification Search
CPC .............................. H04W 24/10; H04W 16/28
USPC ......................................................... 370/329
See application file for complete search history.

(56) References Cited

U.S. PATENT DOCUMENTS

| | | | |
|---|---|---|---|
| 10,498,511 | B2 | 12/2019 | Qin et al. |
| 2010/0291940 | A1 | 11/2010 | Koo et al. |
| 2016/0309376 | A1 | 10/2016 | Liu et al. |

(Continued)

FOREIGN PATENT DOCUMENTS

| | | |
|---|---|---|
| CN | 103326766 A | 9/2013 |
| CN | 108024365 A | 5/2018 |

OTHER PUBLICATIONS

Vivo, "Discussion on beam measurement, beam reporting and beam indication", 3GPP TSG RAN WG1 NR Ad Hoc #3, R1-1715619, Sep. 18-21, 2017, 10 Pages, Nagoya, Japan.

*Primary Examiner* — Angel T Brockman
(74) *Attorney, Agent, or Firm* — Slater Matsil, LLP

(57) ABSTRACT

A computer-implemented method for operating a user equipment (UE) includes measuring beamformed reference signals, selecting one or more beams in accordance with the measured beamformed reference signals, and determining, by the UE, that an uplink transmit power of the UE on a subset of the one or more beams is limited by emission criteria, and based thereon, transmitting, by the UE, a beam report indicating the one or more beams and an uplink transmit power limitation.

27 Claims, 6 Drawing Sheets

(56) References Cited

U.S. PATENT DOCUMENTS

2018/0115957 A1 4/2018 Lin et al.
2018/0167897 A1 6/2018 Sampath et al.

SYSTEM AND METHOD FOR BEAM MANAGEMENT WITH EMISSIONS LIMITATIONS

CROSS-REFERENCE TO RELATED APPLICATIONS

This application is a national phase filing under section 371 of PCT/CN2019/084923, filed Apr. 29, 2019 and entitled "System and Method for Beam Management with Emissions Limitations," which claims priority to U.S. Provisional Patent Application No. 62/788,345 filed Jan. 4, 2019 and entitled "System and Method for Beam Management with Emissions Limitations," all of which are incorporated by reference in their entirety.

TECHNICAL FIELD

The present disclosure relates generally to a system and method for digital communications, and, in particular embodiments, to a system and method for beam management with emissions limitations.

BACKGROUND

Current generation wireless communications systems provide high data rates for mobile communications devices to enable a rich multi-media environment for users of the mobile communications devices. One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies.

Safety concerns regarding exposure to electromagnetic fields (EMF) have led to the publication of safety criteria by International Commission on Non-Ionizing Radiation Protection (ICNIRP), Federal Communication Commission (FCC), IEEE, and so forth. These safety criteria specify limits on the EMF emitted by communications devices. As an example, the specific absorption rate (SAR) criteria specify emissions limits on communications devices operating in the low frequency (LF) range.

SUMMARY

According to a first aspect, a computer-implemented method for operating a user equipment (UE) is provided. The computer-implemented method includes measuring, by the UE, beamformed reference signals, selecting, by the UE, one or more beams in accordance with the measured beamformed reference signals, and determining, by the UE, that an uplink transmit power of the UE on a subset of the one or more beams is limited by emission criteria, and based thereon, transmitting, by the UE, a beam report indicating the one or more beams and an uplink transmit power limitation.

In a first implementation form of the computer-implemented method according to the first aspect as such, wherein the beamformed reference signals are measured during a beam management (BM) procedure.

In a second implementation form of the computer-implemented method according to the first aspect as such or any preceding implementation form of the first aspect, wherein the beam report comprises a non-group-based report.

In a third implementation form of the computer-implemented method according to the first aspect as such or any preceding implementation form of the first aspect, wherein an indicator of the uplink transmit power limitation indicates that the subset the one or more beams are impacted by the emission criteria.

In a fourth implementation form of the computer-implemented method according to the first aspect as such or any preceding implementation form of the first aspect, further comprising determining that the uplink transmit power of the UE according to open loop power control is unachievable, and based thereon, determining that the uplink transmit power of the UE is limited to meet emission criteria.

In a fifth implementation form of the computer-implemented method according to the first aspect as such or any preceding implementation form of the first aspect, wherein the uplink transmit power of the UE is limited to meet emission criteria independent of expected uplink transmit power of the UE.

In a sixth implementation form of the computer-implemented method according to the first aspect as such or any preceding implementation form of the first aspect, wherein the beam report further indicates a power backoff value subject to a maximum transmission power.

In a seventh implementation form of the computer-implemented method according to the first aspect as such or any preceding implementation form of the first aspect, wherein the beam report further indicates a maximum transmit power of the UE subject to the emission criteria.

In an eighth implementation form of the computer-implemented method according to the first aspect as such or any preceding implementation form of the first aspect, wherein the beam report comprises a group-based report.

In a ninth implementation form of the computer-implemented method according to the first aspect as such or any preceding implementation form of the first aspect, further comprising grouping, by the UE, the subset of the one or more beams in accordance with the emission criteria.

In a tenth implementation form of the computer-implemented method according to the first aspect as such or any preceding implementation form of the first aspect, wherein an indicator of the uplink transmit power limitation indicates that the subset of the one or more beams is impacted by the emission criteria.

In an eleventh implementation form of the computer-implemented method according to the first aspect as such or any preceding implementation form of the first aspect, further comprising determining that the uplink transmit power of the UE according to open loop power control is unachievable, and based thereon, determining that the uplink transmit power of the UE is limited to meet emission criteria.

In a twelfth implementation form of the computer-implemented method according to the first aspect as such or any preceding implementation form of the first aspect, wherein the beam report further indicates a power backoff value.

In a thirteenth implementation form of the computer-implemented method according to the first aspect as such or any preceding implementation form of the first aspect, wherein the beam report further indicates a maximum uplink transmit power of the UE subject to the emission criteria.

In a fourteenth implementation form of the computer-implemented method according to the first aspect as such or any preceding implementation form of the first aspect, wherein the beam report is transmitted in a channel state information (CSI) report.

In a fifteenth implementation form of the computer-implemented method according to the first aspect as such or any preceding implementation form of the first aspect, wherein the beamformed reference signals comprise at least one of a channel state information reference signal (CSI-RS) or a synchronization signal block (SSB).

In a sixteenth implementation form of the computer-implemented method according to the first aspect as such or any preceding implementation form of the first aspect, wherein the emission criteria comprises electromagnetic field emission criteria published by at least one of the International Commission on Non-Ionizing Radiation Protection (ICNIRP), the Federal Communication Commission (FCC), or the Institute of Electrical and Electronics Engineers (IEEE).

According to a second aspect, a computer-implemented method for operating an access node is provided. The computer-implemented method includes transmitting, by the access node, beamformed reference signals, receiving, by the access node from a UE, a beam report indicating one or more beams and an uplink transmit power limitation, and selecting, by the access node, one or more BPLs from the one or more beams in accordance with the beam report.

In a first implementation form of the computer-implemented method according to the second aspect as such, wherein the beam report is received in a CSI report.

In a second implementation form of the computer-implemented method according to the second aspect as such or any preceding implementation form of the second aspect, wherein the beamformed reference signals comprise at least one of a CSI-RS or a SSB.

In a third implementation form of the computer-implemented method according to the second aspect as such or any preceding implementation form of the second aspect, wherein the beam report comprises a non-group-based report.

In a fourth implementation form of the computer-implemented method according to the second aspect as such or any preceding implementation form of the second aspect, wherein an indicator of the uplink transmit power limitation indicates that a subset of the one or more beams are impacted by emission criteria.

In a fifth implementation form of the computer-implemented method according to the second aspect as such or any preceding implementation form of the second aspect, wherein the beam report further indicates a power backoff value subject to a maximum transmission power.

In a sixth implementation form of the computer-implemented method according to the second aspect as such or any preceding implementation form of the second aspect, wherein the beam report comprises a group-based report.

In a seventh implementation form of the computer-implemented method according to the second aspect as such or any preceding implementation form of the second aspect, wherein selecting the one or more BPLs comprises selecting the one or more BPLs in accordance with an indicator of the one or more beams and an indicator of the uplink transmit power limitation.

In an eighth implementation form of the computer-implemented method according to the second aspect as such or any preceding implementation form of the second aspect, wherein the emission criteria comprises electromagnetic field emission criteria published by at least one of the ICNIRP, the FCC, or the IEEE.

According to a third aspect, a UE is provided. The UE includes a non-transitory memory storage comprising instructions, and one or more processors in communication with the memory storage. The one or more processors execute the instructions to measure beamformed reference signals, select one or more beams in accordance with the measured beamformed reference signals, and determining, by the UE, that an uplink transmit power of the UE on a subset of the one or more beams is limited by emission criteria, and based thereon, transmitting, by the UE, a beam report indicating the one or more beams and an uplink transmit power limitation.

In a first implementation form of the UE according to the third aspect as such, wherein the beam report comprises a non-group-based report.

In a second implementation form of the UE according to the third aspect as such or any preceding implementation form of the third aspect, wherein an indicator of the uplink transmit power limitation indicates that the subset the one or more beams are impacted by the emission criteria.

In a third implementation form of the UE according to the third aspect as such or any preceding implementation form of the third aspect, wherein the one or more processors further execute the instructions to determine that the uplink transmit power of the UE according to open loop power control is unachievable, and based thereon, determine that the uplink transmit power of the UE is limited to meet emission criteria.

In a fourth implementation form of the UE according to the third aspect as such or any preceding implementation form of the third aspect, wherein the beam report further indicates a power backoff value subject to a maximum transmission power.

In a fifth implementation form of the UE according to the third aspect as such or any preceding implementation form of the third aspect, wherein the beam report further indicates a maximum transmit power of the UE subject to the emission criteria.

In a sixth implementation form of the UE according to the third aspect as such or any preceding implementation form of the third aspect, wherein the beam report comprises a group-based report.

In a seventh implementation form of the UE according to the third aspect as such or any preceding implementation form of the third aspect, wherein the one or more processors further execute the instructions to group the one or more beams in accordance with the emission criteria.

In an eighth implementation form of the UE according to the third aspect as such or any preceding implementation form of the third aspect, wherein an indicator of the uplink transmit power limitation indicates that a subset of the one or more beams is impacted by the emission criteria.

According to a fourth aspect, an access node is provided. The access node includes a non-transitory memory storage comprising instructions, and one or more processors in communication with the memory storage. The one or more processors execute the instructions to transmit beamformed reference signals, receive, from a UE, a beam report indicating one or more beams and an uplink transmit power limitation, and select one or more BPLs from the one or more beams in accordance with the beam report.

In a first implementation form of the access node according to the fourth aspect as such, wherein the beam report is received in a CSI report.

In a second implementation form of the access node according to the fourth aspect as such or any preceding implementation form of the fourth aspect, wherein the beam report comprises a non-group-based report.

In a third implementation form of the access node according to the fourth aspect as such or any preceding implementation form of the fourth aspect, wherein an indicator of the uplink transmit power limitation indicates that a subset of the one or more beams are impacted by emission criteria.

In a fourth implementation form of the access node according to the fourth aspect as such or any preceding implementation form of the fourth aspect, wherein the beam report further indicates a power backoff value subject to a maximum transmission power.

In a fifth implementation form of the access node according to the fourth aspect as such or any preceding implementation form of the fourth aspect, wherein the beam report comprises a group-based report.

In a sixth implementation form of the access node according to the fourth aspect as such or any preceding implementation form of the fourth aspect, wherein the one or more processors further execute the instructions to select the one or more BPLs in accordance with an indicator of the one or more beams and an indicator of the uplink transmit power limitation.

An advantage of a preferred embodiment is that the inclusion of information regarding a limitation on the transmit power level of a device enables an access node serving the device to select BPLs that optimize performance. The selected BPLs may be asymmetric in nature to permit individualized performance optimization in the uplink and the downlink.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable concepts that can be embodied in a wide variety of specific contexts. The specific embodiments discussed are merely illustrative of specific ways to make and use the embodiments, and do not limit the scope of the disclosure.

Figure 1:
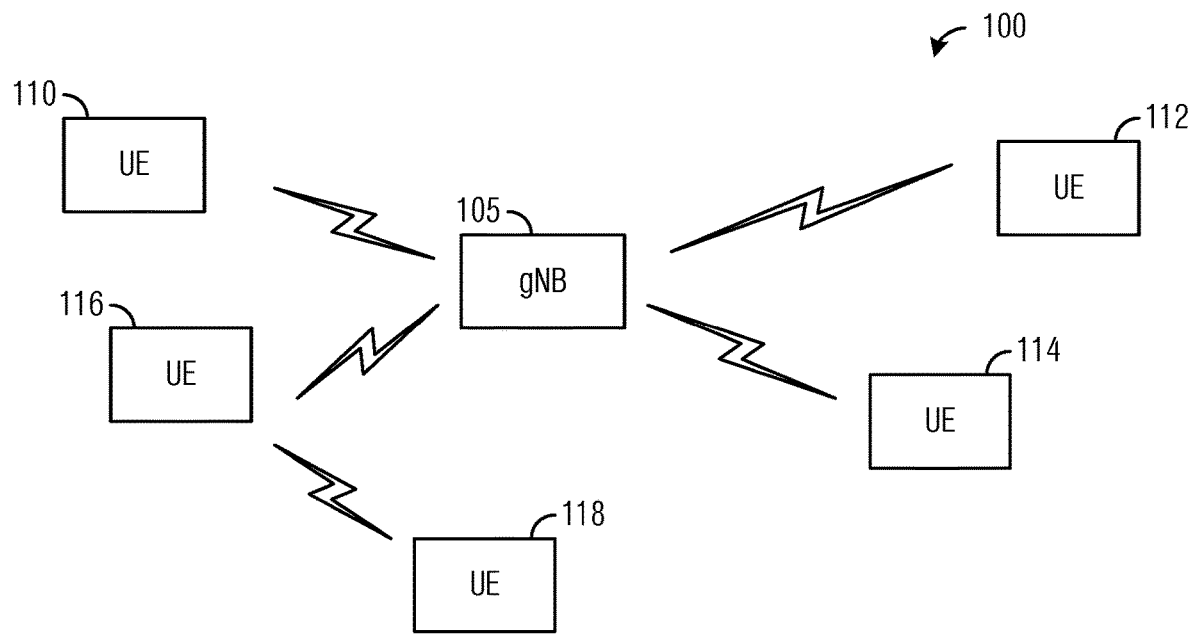
FIG. 1 illustrates an example communications system.

FIG. 1 illustrates an example communications system 100. Communications system 100 includes next generation Node B (gNB) 105 serving user equipments (UEs), including UE 110, UE 112, UE 114, UE 116, and UE 118. In a first operating mode, communications to and from UE 110 pass through gNB 105. In a second operating mode, communications to and from UE 110 do not pass through gNB 105, however, gNB 105 typically allocates resources used by UE 110 to communicate. gNBs may also be commonly referred to as access nodes, Node Bs, evolved Node Bs (eNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, subscribers, stations, and the like. gNBs may provide wireless access in accordance with one or more wireless communication protocols, e.g., the Third Generation Partnership Project (3GPP) long term evolution (LTE), LTE advanced (LTE-A), 5G, 5G NR, High Speed Packet Access (HSPA), Wi-Fi 802.11a/b/g/n/ac/ad/ax/ay, etc. While it is understood that communications systems may employ multiple gNBs capable of communicating with a number of UEs, only one eNB and five UEs are illustrated for simplicity.

In some instances, UEs are also commonly referred to as users. However, in the discussion presented herein, the term user is used to refer to an actual person utilizing a UE. As an example, a user would hold a UE up to his or her ear to listen to a conversation. As another example, a user would have a UE clipped to his or her belt and use a wireless headset to hold a conversation or listen to content received by the UE. Other scenarios where the UE would be in close proximity to the user are possible.

As discussed previously, there are significant safety concerns regarding exposure to electromagnetic fields (EMF) emitted by communications devices. These safety concerns have led to many organizations, including International Commission on Non-Ionizing Radiation Protection (ICNIRP), Federal Communication Commission (FCC), IEEE, and so forth, to publish safety criteria or safety guidelines that specify limits on the EMF emitted by communications devices to help prevent adverse health effects associated with exposure to EMF. As an example, the specific absorption rate (SAR) criteria or guidelines specify emissions limits on communications devices operating in the low frequency (LF) range. Similar to LF UEs, fifth generation (5G) New Radio (NR) compliant UEs need to comply with maximum permissible exposure (MPE) criteria. The SAR criteria, the MPE criteria, and other EMF safety related criteria may be referred to as emission criteria.

As an example, at frequencies above 6 gigahertz (GHz) and 10 GHz, the FCC and ICNIRP, respectively, change the exposure limits from SAR (measured in Watts per kilogram (W/kg)) to free-space incident power density (PD), measured in Watts per meter squared (W/m$^2$)). The exposure limits specified by the FCC and ICNIRP are more restrictive in terms of maximum allowed output power in the uplink within the HF range. Table 1 illustrates the exposure limits specified by the FCC, ICNIRP, and IEEE. A device, operating in HF, should limit its transmission power to comply with the emission criteria. Therefore, when a device, such as a UE, is close to a human body, i.e., the user, the transmission power of the device has to be reduced in order to comply with the emission criteria.

TABLE 1

Exposure limits specified by FCC, ICNIRP, and IEEE for HF.

| | FCC | ICNIRP | IEEE $C_{95.1}$ draft |
|---|---|---|---|
| $f_{tr}$ (GHz) | 6 | 10 | 6 |
| PD limit (W/m$^2$) | 10 | 10 | $55 * f^{-0.177}$ |
| $f \geq f_{tr}$ | (averaged over 1 cm$^2$) | (averaged over 20 cm$^2$) | (averaged over 4 cm$^2$) |

As discussed previously, pathloss in communications systems operating at HF (e.g., 6 gigahertz (GHz) and above, such as millimeter wavelength (mmWave)) operating frequencies is high, and beamforming may be used to overcome the high pathloss. A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2A:
FIG. 2A illustrates a communications system highlighting a first example situation where the transmission power is limited by emission criteria.

Due to the directional nature of beamforming, a transmission beamformed in a first direction that impinges upon the user, and therefore the transmission power is limited by the emission criteria, while a transmission beamformed in a second direction that does not impinge upon the user is not limited by the emission criteria. FIG. 2A illustrates a communications system 200 highlighting a first example situation where the transmission power is limited by emission criteria. As shown in FIG. 2A, a gNB 205 and a UE 210 are communicating. A user 212 of UE 210 is located in between UE 210 and gNB 205. Because user 212 is located between UE 210 and gNB 205, user 212 is exposed to EMF of transmissions made by UE 210 to gNB 205 (e.g., arrowed line 215) and transmissions made by gNB 205 to UE 210 (e.g., arrowed line 217). Furthermore, because user 212 is adjacent to UE 210, user 212 is exposed to EMF of transmissions made by UE 210 at or approximately at the full transmission power of the transmission. On the other hand, user 212 is exposed to EMF of transmissions made by gNB 205 to UE 210 at a fraction of the transmission power of the transmission.

Figure 2B:
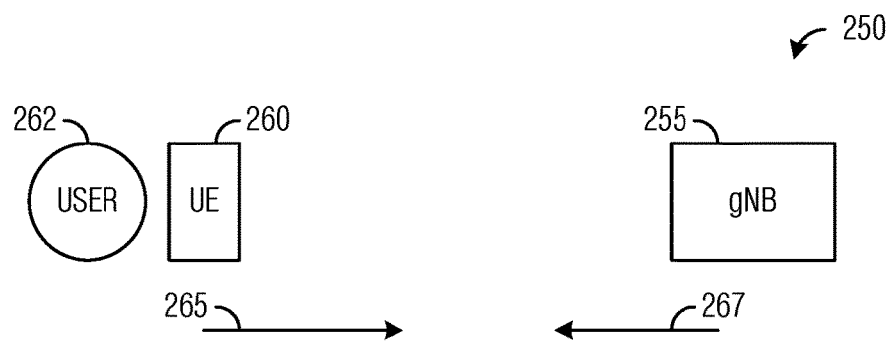
FIG. 2B illustrates a communications system highlighting a second example situation where the transmission power is not limited by emission criteria.

FIG. 2B illustrates a communications system 250 highlighting a second example situation where the transmission power is not limited by emission criteria. As shown in FIG. 2B, a gNB 255 and a UE 260 are communicating. A user 262 of UE 260 is located next to UE 260, but is not in between UE 260 and gNB 255. Because user 262 is not located between UE 260 and gNB 255, user 262 is not exposed to significant amounts EMF transmissions made by UE 260 to gNB 255 (e.g., arrowed line 265) and transmissions made by gNB 255 to UE 260 (e.g., arrowed line 267). As an example, due to the directional nature of beamforming, only a small amount of EMF of transmissions made by UE 260 to gNB 255 (e.g., arrowed line 265) is directed towards user 262, so the exposure of user 262 to EMF of transmissions made by UE 260 to gNB 255 (e.g., arrowed line 265) is small. Therefore, it may not be necessary to limit the transmission power of such transmissions to meet emission criteria.

Figure 3A:
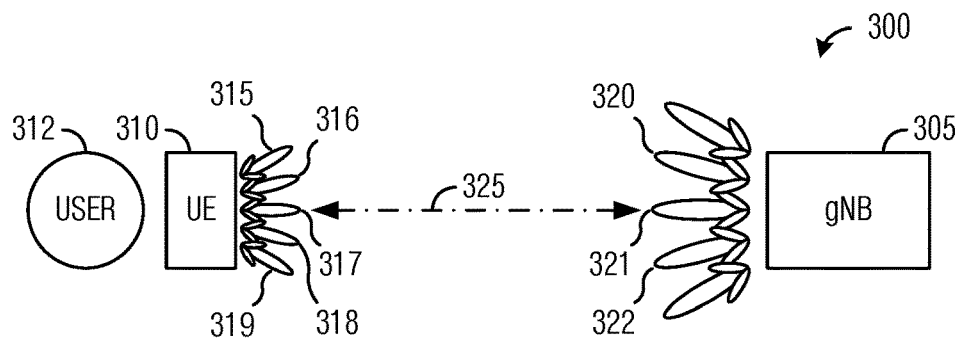
FIG. 3A illustrates a communications system highlighting communications beams and beam pair links.

FIG. 3A illustrates a communications system 300 highlighting communications beams and beam pair links (BPLs). Communications system 300 includes a gNB 305 serving a UE 310. As shown in FIG. 3A, UE 310 is operated by a user 312. Both gNB 305 and UE 310 use beamformed communications, with gNB 305 capable of using a variety of beams, including but not limited to, beams 320, 321, and 322; and similarly, with UE 310 being capable of using a variety of beams, including but not limited to, beams 315, 316, 317, 318, and 319.

Although gNB 305 and UE 310 are capable of communicating using a variety of beams, usually, best performance (e.g., highest signal plus interference to noise ratio (SINR), highest signal to noise ratio (SNR), highest data rate, lowest error rate, and so on) is achieved using a subset of the beams. As an example, in a deployment where there is a clear line-of-sight path between gNB 305 and UE 310, the best performance typically occurs when beams that are directly oriented (or as close to directly oriented as possible) towards the two devices are used. As shown in FIG. 3A, beams 317 and 321 would be expected to produce the best performance in a deployment with a clear line-of-sight path between gNB 305 and UE 310.

For discussion purposes, consider a situation where beams 317 and 321 produce the best communications performance. In such a situation, beams 317 and 321 form a BPL (labeled BPL 325). A BPL comprises a transmit beam and receive beam combination. Because communications links are unidirectional, there is at least one downlink BPL and at least one uplink BPL for each pair of communicating devices. As an example, for gNB 305 and UE 310, a downlink BPL comprises a transmit beam corresponding to beam 321 and a receive beam corresponding to beam 317, and an uplink BPL comprises a transmit beam corresponding to beam 317 and a receive beam corresponding to beam 317. Because the downlink BPL and the uplink BPL are formed from the same beams (or beams that have beam correspondence), the downlink BPL and the uplink BPL are said to be symmetric. When the downlink BPL and the uplink BPL are formed from different beams (or beams that do not have beam correspondence), the downlink BPL and the uplink BPL are said to be asymmetric.

In communications systems that are operating at higher frequencies, such as mmWave communications systems, communications devices generally have a large number of transmit or receive antennas that share a smaller number of radio frequency (RF) chains. From the perspective of a communications device, the beamformed transmit and receive beams should have the same (or substantially the same) beam pattern (in terms of peak or non-peak beam direction, peak or non-peak beam gain, peak or non-peak beam width, and so on, for example) in the spatial domain. This means that for each beamformed beam, the beam response on all directions should be the same (or substantially the same) from the point of view of the transmitter and the receiver. This is known as the beam correspondence condition, and when the beam correspondence condition is met, beam correspondence is achieved. As an example, a receive beam and a transmit beam that make up a BPL at a communications device typically hold beam correspondence. The beams that meet the beam correspondence condition are said to be beam correspondent.

However, in a situation where the transmission power of one communicating device is limited (due to emission criteria, for example), a symmetric BPL may not yield the best performance. A reason for this is that the coverage of a transmission power limited transmission is reduced due to the lower transmission power. Therefore, the performance of the transmission power limited BPL is lower than a similar BPL that is not transmission power limited.

Figure 3B:
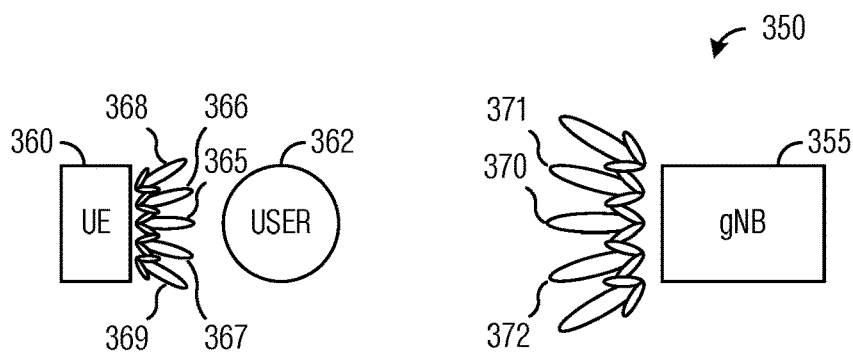
FIG. 3B illustrates a communications system highlighting communications beams and BPLs in a deployment where the transmission power of a communications device is limited.

FIG. 3B illustrates a communications system 350 highlighting communications beams and BPLs in a deployment where the transmission power of a communications device is limited. The transmission power of the communications device may be limited due to emission criteria, for example. Communications system 350 includes a gNB 355 serving a UE 360. As shown in FIG. 3B, UE 360 is operated by a user 362 who is positioned between UE 360 and gNB 355. Both gNB 355 and UE 360 use beamformed communications, with gNB 355 capable of using a variety of beams, including but not limited to, beams 370, 371, and 372; and similarly, with UE 360 being capable of using a variety of beams, including but not limited to, beams 365, 366, 367, 368, and 369.

However, the transmission power of transmissions utilizing some of the beams may need to be limited in order to meet emission criteria due to their orientation with respect to user 362. As an example, a transmission utilizing beam 365 may have its transmission power limited because beam 365 is oriented directly at user 362. As another example, a transmission utilizing beams 366 or 367 may have its transmission power limited because beams 366 or 367 are oriented at user 362 by a substantial amount. As yet another example, a transmission utilizing beams 368 or 369 may not have its transmission power limited because beams 368 or 369 are substantially not oriented at user 362. Hence, although a transmission may use a beam that is substantially not directed at a user and a gNB (such as beams 368 or 369), not having to limit the transmission power may result in a BPL with better performance when compared to a BPL utilizing a beam that is directly oriented towards the user and the gNB but has to limit its transmission power.

Figure 3C:
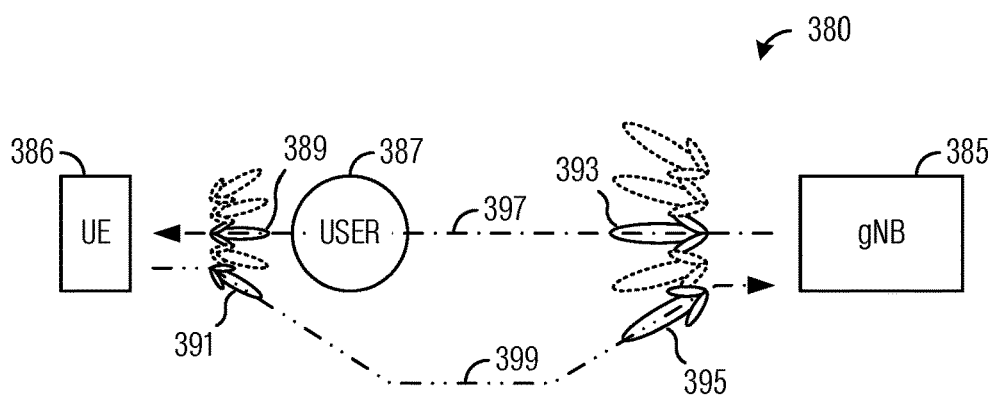
FIG. 3C illustrates a communications system highlighting asymmetric BPLs.

FIG. 3C illustrates a communications system 380 highlighting asymmetric BPLs. Communications system 380 includes a gNB 385 serving a UE 386, where a user 387 of UE 386 is located between UE 386 and gNB 385. Therefore, uplink transmissions from UE 386 using a beam 389 that is oriented directly towards gNB 385 may have its transmission power limited to meet emission criteria. However, downlink transmissions from gNB 385 to UE 386 may not be similarly limited, due to the pathloss associated with a communications channel between gNB 385 and UE 386. Therefore, a downlink BPL (shown as dotted-dashed line 397) may include a transmission beam at gNB 385 that is associated with beam 393 and a receive beam at UE 386 that is associated with beam 389.

Because the uplink transmissions from UE 386 to gNB 385 may be transmission power limited when a beam at UE 386 that is directly oriented towards gNB 385 is used, it may be possible that an uplink BPL comprising a beam at UE 386 that is not directly oriented towards gNB 385 yields the best performance. As an example, an uplink BPL (shown as dotted-dashed line 399) including a transmission beam at UE 386 that is associated with beam 391 and a receive beam at gNB 385 that is associated with beam 395 results in better performance than an uplink BPL that utilizes beams directly oriented towards gNB 385 (e.g., an uplink BPL that is beam correspondent with downlink BPL shown as dotted-dashed line 397).

The determination of uplink BPLs and downlink BPLs take place during a beam management (BM) procedure, for example. In a BM procedure, a gNB configures and transmits beamformed reference signals, which are measured by UEs. The UEs selects beams based on a selection criterion and sends a beam report to the gNB. The gNB selects BPLs based on the beam report. In 5G NR, for UEs with beam correspondence capability, uplink beam management may be simply based on downlink beam management.

Figures 4A, 4B:
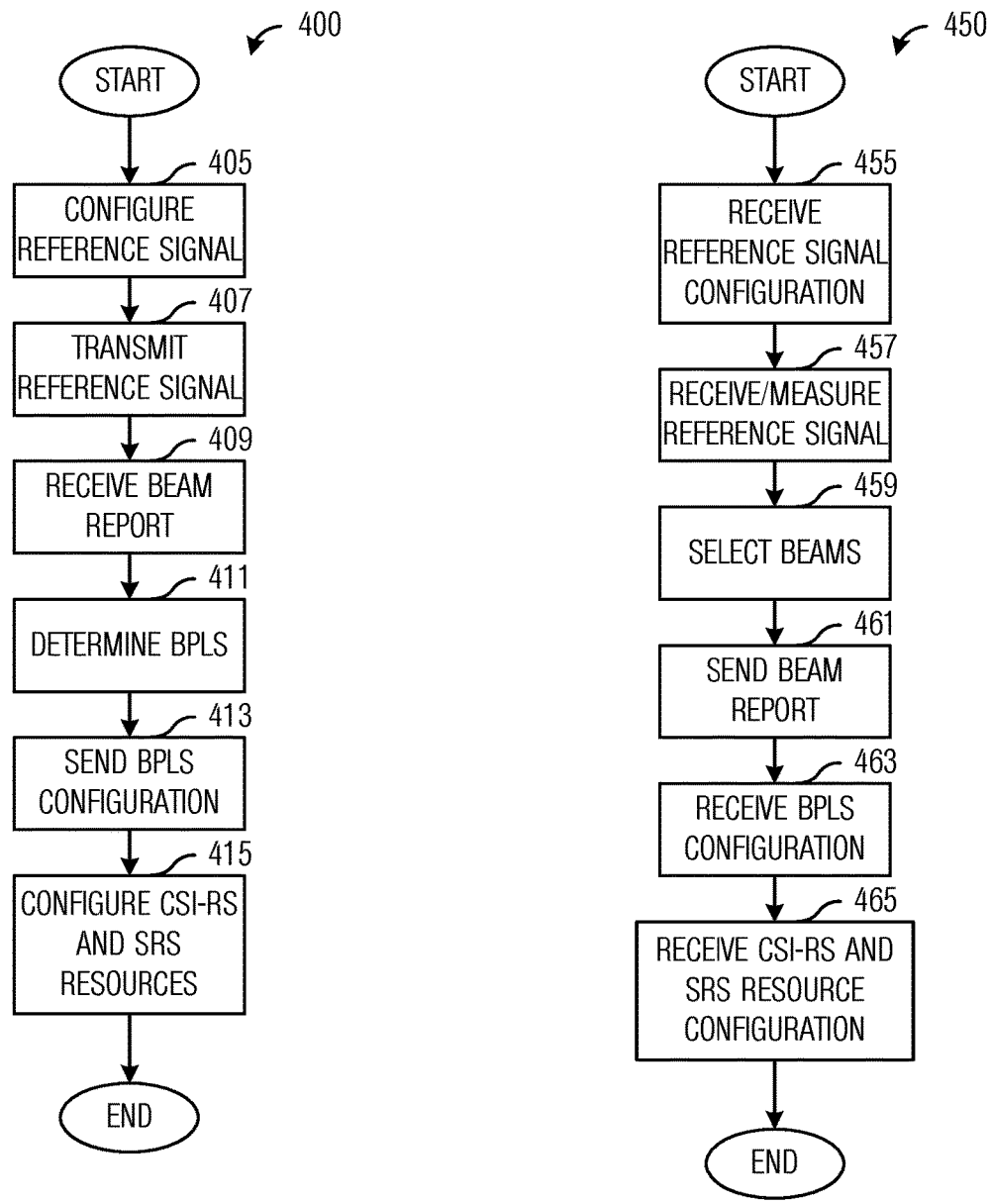
FIG. 4A illustrates a flow diagram of prior art operations occurring in a gNB participating in a BM procedure.
FIG. 4B illustrates a flow diagram of prior art operations occurring in a UE participating in a BM procedure.

FIG. 4A illustrates a flow diagram of prior art operations 400 occurring in a gNB participating in a BM procedure. Operations 400 may be indicative of operations occurring in a gNB as the gNB participates in a BM procedure.

Operations 400 begin with the gNB configuring reference signals (block 405). Examples of the reference signals may include channel state information reference signals (CSI-RS), synchronization signal blocks (SSB), and so on. The configuration of the reference signals may also specify which resources will be used to transmit the reference signals. The configuration of the reference signals may also specify the beamforming applied to the reference signals. The gNB may utilize all of its available beams or a subset of the available beams. The configuration of the reference signals may include the gNB sending configuration information of the reference signals to the UE. The gNB transmits the reference signals (block 407). As stated above, the reference signals may be beamformed. In such a situation, the gNB may transmit a first beamformed reference signal for a specified amount of time, transmit a second beamformed reference signal for a specified amount of time, and so on. This process may be referred to as sounding.

The gNB receives a beam report (block 409). The beam report may include information about beams associated with beamformed reference signals measured by the UE. The information about the beams may include information about the beams that meet a selection criterion, such as best reference signal received power (RSRP), a specified number of top RSRP, best Layer 1 RSRP (L1-RSRP), a specified number of top L1-RSRP, best received signal received quality (RSRQ), a specified number of top RSRQ, and so on. The beam report may be group-based or non-group-based.

The gNB determines BPLs (block 411). The BPLs may be determined in accordance with the information received in the beam report. As an example, the gNB selects, as a downlink BPL, a transmit beam corresponding to the beamformed reference signal with the best RSRP and a receive beam at the UE corresponding to the transmit beam with the best RSRP, as provided in the beam report. If the UE supports beam correspondence, an uplink BPL is selected based on the downlink BPL. In a symmetric BPL situation, the uplink BPL and the downlink BPL are associated with the same beams at the gNB and the UE.

The gNB sends configuration information about the BPLs (block 413). As an example, the gNB sends beam index information about the BPLs to the UE. As another example, the gNB sends code index information about the BPLs to the UE. The gNB configures CSI-RS resources and sounding reference signal (SRS) resources (block 415). The CSI-RS resources may be used by the UE to make downlink CSI measurements, while the SRS resources may be used by the UE to transmit SRS for uplink channel measurements (i.e., uplink channel sounding). The configuration of the CSI-RS and SRS resources may include the gNB sending configuration information related to the CSI-RS and SRS resources to the UE.

FIG. 4B illustrates a flow diagram of prior art operations 450 occurring in a UE participating in a BM procedure. Operations 450 may be indicative of operations occurring in a UE as the UE participates in a BM procedure.

Operations 450 begin with the UE receiving configuration information about reference signals (such as CSI-RS, SSB, and so on) (block 455). The configuration information may also include information about resources used to transmit the reference signals. The configuration information may also include information about the beamforming applied to the reference signals. The UE receives and measures the reference signals (block 457). The measurement of the reference signals may be RSRP measurements, L1-RSRP measurements, RSRQ measurements, and so on. The UE may use one or more receive beams to receive and measure the reference signals. As an example, the UE uses a first receive beam to receive and measure the reference signals for a specified amount of time, a second receive beam to receive and measure the reference signals for a specified amount of time, and so on.

The UE selects beams (block 459). The UE may select received and measured reference signals based on a selection criterion, such as best RSRP, a specified number of top RSRP, best L1-RSRP, a specified number of top L1-RSRP, best RSRQ, a specified number of top RSRQ, and so on. The UE determines the transmit beams of the reference signals associated with the received and measured reference signals that meet the selection criterion. The UE sends a beam report (block 461). The beam report includes information about the transmit beams of the reference signals associated with the received and measured reference signals that meet the selection criterion. As an example, the information comprises beam indices of the transmit beams. As another example, the information comprises coding information of the transmit beams, such as CSI-RS resource indicator (CRI), SS/PBCH Block Resource indicator (SSBRI), code sequence index, cyclic prefix, and so forth.

The UE receives configuration information about BPLs configured by the gNB (block 463). The BPLs may be determined in accordance with the information received in the beam report. As an example, the gNB selects, as a downlink BPL, a transmit beam corresponding to the beamformed reference signal with the best RSRP, as provided in the beam report. If the UE supports beam correspondence, an uplink BPL is selected based on the downlink BPL. In a symmetric BPL situation, the uplink BPL and the downlink BPL are associated with the same beams at the gNB and the UE. As an example, the UE receives beam index information about the BPLs. As another example, the UE receives code index information about the BPLs. The UE receives configuration information about CSI-RS resources and SRS resources (block 465). The CSI-RS resources may be used by the UE to make downlink CSI measurements, while the SRS resources may be used by the UE to transmit SRS for uplink channel measurements (i.e., uplink channel sounding).

As discussed previously, knowledge of transmission power limited transmissions may lead to the selection of asymmetric BPLs that yield better communications performance. However, the prior art BM procedure does not signal information regarding transmission power limited transmissions nor does it consider transmission power limited transmissions in the determination of BPLs. Therefore, there is a need for systems and methods for beam management with emissions limitations.

According to an example embodiment, a beam management procedure considering transmission power limited transmissions is provided. The beam management procedure includes a report of information that at least some transmissions have transmission power limitations due to emission criteria (e.g., safety criteria or governmental criteria). The beam management procedure also includes the use of the information that at least some transmissions have transmission power limitations due to emission criteria in the determination of BPLs.

According to an example embodiment, abeam report includes information regarding an uplink transmit power limitation. In an embodiment, a UE sends a beam report to a gNB, where the beam report includes information about beams selected by the UE that meet a selection criterion. The beam report also includes information that transmissions of the UE are impacted by emission criteria.

As specified in 3GPP NR Release 15, beam reporting may be group-based or non-group-based. When a UE is configured with non-group-based beam reporting, the UE reports in a single report a configured number (configured by higher layer signaling, for example) of different CRI or SSBRI for each report setting. When a UE is configured with group-based beam reporting, the UE reports, in a single reporting instance, two different CRI or SSBRI for each report setting. CSI-RS or SSB resources can be received simultaneously by the UE either with a single spatial domain receive filter or with multiple simultaneous spatial domain receive filters.

In an embodiment, the beam report is a non-group-based beam report. In non-group-based beam reports, each beam is reported separately. As a first example, the UE includes in the beam report an indication that a reported beam is impacted by an emission criterion. As an example, a flag that is associated with a beam index (such as a CRI or a SSBRI) indicates that the beam associated with the beam index is transmission power limited due to emission criteria. As another example, if there is a plurality of beams impacted by the emission criteria, the beam report includes a flag for each of the beams impacted by the emission criteria. The flags may be in the form of a bitmap, with each bit in the bitmap used as a flag, for example. The length of the bitmap may be equal to the number of beams in the beam report, for example. The length of the bitmap may be equal to the total number of beams sounded by the gNB, for example. In a first option, the flag associated with a beam index is set to indicate that the beam associated with the beam index is transmission power limited if the transmission power of a transmission on the beam determined based on open-loop power control (PC) cannot be met by the UE. In a second option, the flag associated with a beam index is set to indicate that the beam associated with the beam index is transmission power limited due to emission criteria, independent of expected transmit power of the transmission.

As a second example, the UE includes in the beam report an indication that a reported beam is impacted by an emission criterion, along with a power back-off value. The power back-off value is a reduction in the transmission power of the transmission on the reported beam relative to the maximum transmission power in order to meet emission criteria. The power back-off value is specified in dB, for example. The power back-off value is specified as an index to a table of back-off values, for example. As a third example, the UE includes in the beam report an indication that a reported beam is impacted by an emission criterion, along with a maximum transmission power for a transmission on the reported beam that will meet emission criteria. The maximum transmission power is specified in dBm, for example. The maximum transmission power is specified as an index to a table of maximum transmission powers, for example.

In an embodiment, the beam report is a group-based beam report. In group-based beam reports, the beam reports may include the information and structure as described above for non-group-based beam reports. In group-based beam reports, beams may, in addition, be grouped together based on similar emission criterion limitations, for example, with the beam reports including the information and structure as described above for non-group-based beam reports.

Figure 5A:
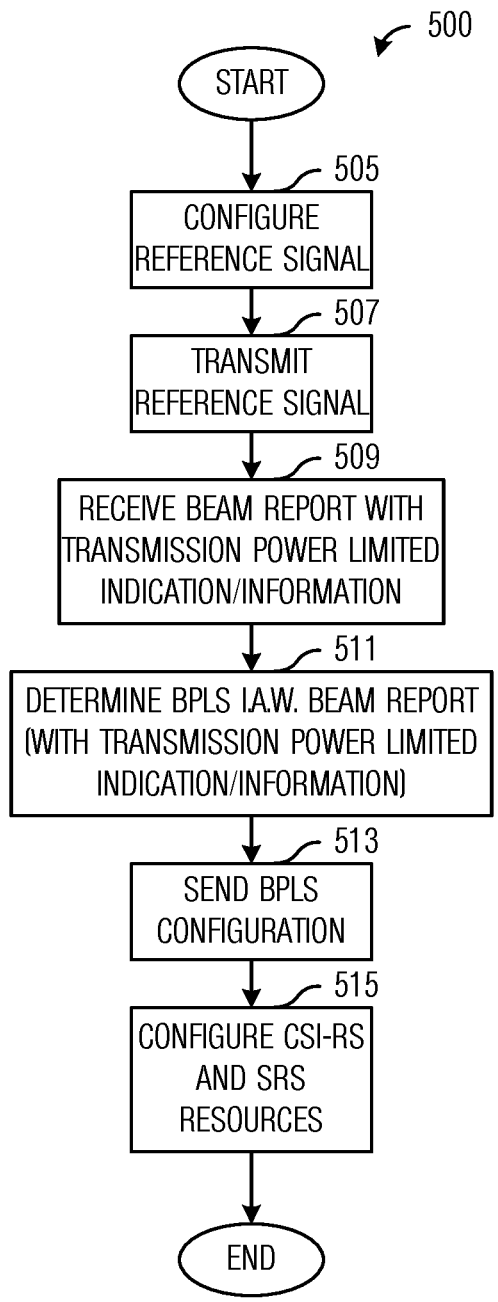
FIG. 5A illustrates a flow diagram of operations occurring in a gNB participating in a BM procedure, wherein transmission power limited transmissions are considered in the determination of BPLs according to example embodiments presented herein.

FIG. 5A illustrates a flow diagram of operations 500 occurring in a gNB participating in a BM procedure, wherein transmission power limited transmissions are considered in the determination of BPLs. Operations 500 may be indicative of operations occurring in a gNB as the gNB participates in a BM procedure, wherein transmission power limited transmissions are considered in the determination of BPLs. The transmission power may be limited due to emission criteria, such as safety criteria or regulatory criteria, for example.

Operations 500 begin with the gNB configuring reference signals (block 505). Examples of the reference signals may include CSI-RSs, SSBs, and so on. The configuration of the reference signals may also specify which resources will be used to transmit the reference signals. The configuration of the reference signals may also specify the beamforming applied to the reference signals. The gNB may utilize all of its available beams or a subset of the available beams. The configuration of the reference signals may include the gNB sending configuration information of the reference signals to the UE. The gNB transmits the reference signals (block 507). As stated above, the reference signals may be beamformed. In such a situation, the gNB may transmit a first beamformed reference signal for a specified amount of time, transmit a second beamformed reference signal for a specified amount of time, and so on.

The gNB receives a beam report (block 509). The beam report may be a non-group-based beam report or a group-based beam report. The beam report may include information about beams associated with beamformed reference signals measured by the UE, as well as a transmission power limited indication or information related to the transmission power limitation. The information about the beams may include information about the beams that meet a selection criterion, such as best RSRP, a specified number of top RSRP, best L1-RSRP, a specified number of top L1-RSRP, best RSRQ, a specified number of top RSRQ, and so on. The transmission power limited indication or information related to the transmission power limitation may be in the form of one or more flags, with each flag being associated with a beam that is transmission power limited due to emission criteria, information about how much the transmission power of a beam is limited due to the emission criteria, information about the maximum transmission power of a beam that is transmission power limited due to the emission criteria, or a combination thereof. The beam report may also include beam groups formed with beams with similar emission criterion limitations.

As an example, the beam report may be received in a physical uplink channel (PUCCH). The beam report may include reference signal indices (such as CRI or SSBRI) of beams meeting a selection criterion, signal quality information (such as RSRP, RSRQ, SINR, SNR, and so on) associated with each beam meeting the selection criterion, as well as a transmission power limited indication or information related to the transmission power limitation for each beam meeting the selection criterion. Table 2 illustrates an example mapping of CSI fields. Other beam report formats are possible.

TABLE 2

Example mapping of CSI fields.

| CSI Report Number | CSI Fields |
| --- | --- |
| CSI Report #n | CRI or SSBRI #1, if reported |
| | CRI or SSBRI #2, if reported |
| | CRI or SSBRI #3, if reported |
| | CRI or SSBRI #4, if reported |
| | RSRP #1, if reported |
| | Differential RSRP #2, if reported |
| | Differential RSRP #3, if reported |
| | Differential RSRP #4, if reported |
| | Transmission Power Limited Indication on CRI or SSBRI #1, if reported |
| | Transmission Power Limited Indication on CRI or SSBRI #2, if reported |
| | Transmission Power Limited Indication on CRI or SSBRI #3, if reported |
| | Transmission Power Limited Indication on CRI or SSBRI #4, if reported |

Following the example mapping shown in Table 2, a beam report may be as follows:

CRI: 3, 4, 5

RSRP/Diff RSRP (dBm): −60, −10, −9

Transmission Power

Limited Indication: N, Y, Y

As shown in the example, the beam report includes information for three CRIs: CRI 3, 4, and 5, wherein CRI 3 is not transmission power limited due to emission criteria, while CRI 4 and 5 are transmission power limited (at 10 dBm and 9 dBM below the RSRP of CRI 3, respectively).

The gNB determines BPLs in accordance with the beam report (block 511). The BPLs may be determined in accordance with the beam report, which includes information about beams associated with beamformed reference signals measured by the UE, as well as a transmission power limited indication or information related to the transmission power limitation. The gNB may elect to utilize all of the information included in the beam report. The gNB may elect to utilize a subset of the information included in the beam report. The gNB may elect to utilize none of the information included in the beam report. As an illustrative example, in a situation where a beam report does not include an indicator indicating that there is a beam that is impacted by emission criteria, the gNB may simply select a beam with the best signal quality as a first BPL (for downlink transmissions, for example), and then, using beam correspondence, select a second BPL (for uplink transmissions, for example). However, if a beam report does include one or more indicators indicating that there is a beam that is impacted by emission criteria, the gNB may select a beam with the best signal quality as a first BPL (for downlink transmissions, for example), then, again using the beam report, select a potentially different beam as a second BPL (for uplink transmissions, for example). If different (in terms of BPLs that are not beam correspondent) BPLs are selected, then asymmetric BPLs are used for this particular gNB-UE combination.

The gNB sends configuration information about the BPLs (block 513). As an example, the gNB sends beam index information about the BPLs to the UE. As another example, the gNB sends code index information about the BPLs to the UE. The gNB configures CSI-RS resources and SRS resources (block 515). The CSI-RS resources may be used by the UE to make downlink CSI measurements, while the SRS resources may be used by the UE to transmit SRS for uplink channel measurements (i.e., uplink channel sounding). The configuration of the CSI-RS and SRS resources may include the gNB sending configuration information related to the CSI-RS and SRS resources to the UE.

Figure 5B:
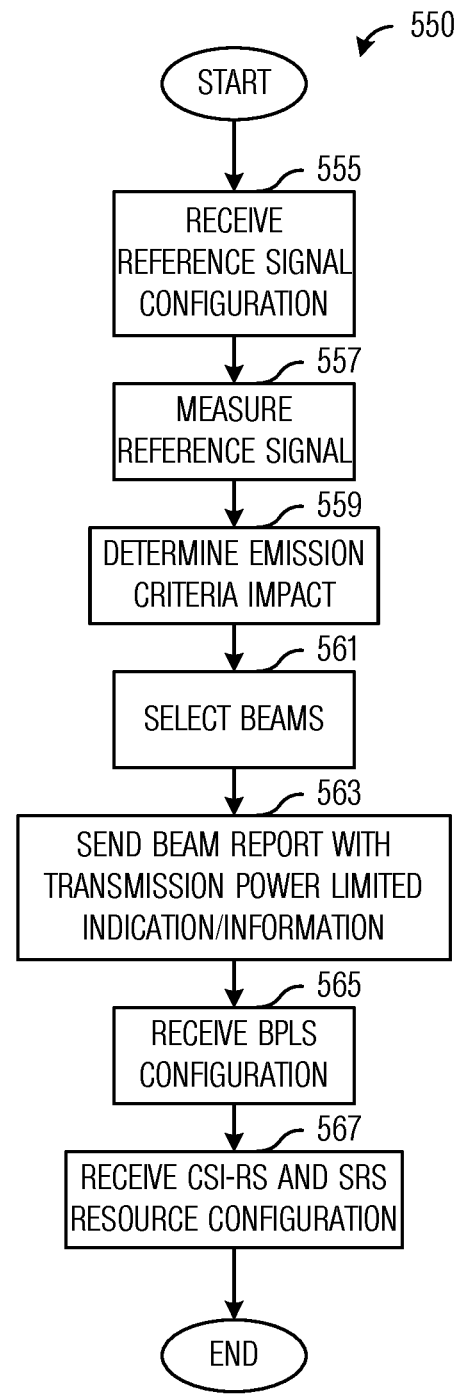
FIG. 5B illustrates a flow diagram of operations occurring in a UE participating in a BM procedure, wherein transmission power limited transmissions are considered in the determination of BPLs according to example embodiments presented herein.

FIG. 5B illustrates a flow diagram of operations 550 occurring in a UE participating in a BM procedure, wherein transmission power limited transmissions are considered in the determination of BPLs. Operations 550 may be indicative of operations occurring in a UE as the UE participates in a BM procedure, wherein transmission power limited transmissions are considered in the determination of BPLs. The transmission power may be limited due to emission criteria, such as safety criteria or regulatory criteria, for example.

Operations 550 begin with the UE receiving configuration information about reference signals (such as CSI-RS, SSB, and so on) (block 555). The configuration information may also include information about resources used to transmit the reference signals. The configuration information may also include information about the beamforming applied to the reference signals. The UE receives and measures the reference signals (block 557). The measurement of the reference signals may be RSRP measurements, L1-RSRP measurements, RSRQ measurements, and so on. The UE may use one or more receive beams to receive and measure the reference signals. As an example, the UE uses a first receive beam to receive and measure the reference signals for a specified amount of time, a second receive beam to receive and measure the reference signals for a specified amount of time, and so on.

The UE determines emission criteria impact (block 559). The UE determines which of its transmit beams are impacted by the emission criteria. As an example, the transmit beams that are oriented towards the head of the user of the UE as the UE is held up to the ear of the user are impacted by the emission criteria, while other transmit beams of the UE are not impacted by the emission criteria. Similarly, the transmit beams that are oriented towards the body of the user of the UE as the UE is worn on a belt of the user are impacted by the emission criteria, while other transmit beams of the UE are not impacted by the emission criteria. A sensor may detect the abutment of the UE against the user, for example. An ultrasonic sensor may be used to detect the user being adjacent to the UE, for example.

The UE selects beams (block 561). The UE may select received and measured reference signals based on a selection criterion, such as best RSRP, a specified number of top RSRP, best L1-RSRP, a specified number of top L1-RSRP, best RSRQ, a specified number of top RSRQ, and so on. The UE determines the transmit beams of the reference signals associated with the received and measured reference signals that meet the selection criterion.

The UE sends a beam report (block 563). The beam report may be a non-group-based beam report or a group-based beam report. The beam report may include information about beams associated with beamformed reference signals measured by the UE, as well as a transmission power limited indication or information related to the transmission power limitation. The information about the beams may include information about the beams that meet a selection criterion, such as best RSRP, a specified number of top RSRP, best L1-RSRP, a specified number of top L1-RSRP, best RSRQ, a specified number of top RSRQ, and so on. The transmission power limited indication or information related to the transmission power limitation may be in the form of one or more flags, with each flag being associated with a beam that is transmission power limited due to emission criteria, information about how much the transmission power of a beam is limited due to the emission criteria, information about the maximum transmission power of a beam that is transmission power limited due to the emission criteria, or a combination thereof. The beam report may also include beam groups formed with beams with similar emission criterion limitations.

As an example, the beam report may be sent in a PUCCH. The beam report may include reference signal indices (such as CRI or SSBRI) of beams meeting a selection criterion, signal quality information (such as RSRP, RSRQ, SINR, SNR, and so on) associated with each beam meeting the selection criterion, as well as a transmission power limited indication or information related to the transmission power limitation for each beam meeting the selection criterion.

The UE receives configuration information about the BPLs (block 565). The BPLs are configured by the gNB based on the beam report sent by the UE, for example. The BPLs may be determined by the gNB in accordance with the beam report, which includes information about beams associated with beamformed reference signals measured by the UE, as well as a transmission power limited indication or information related to the transmission power limitation. The UE receives configuration information related to the CSI-RS and SRS resources configured by the gNB (block 567).

Figure 6:
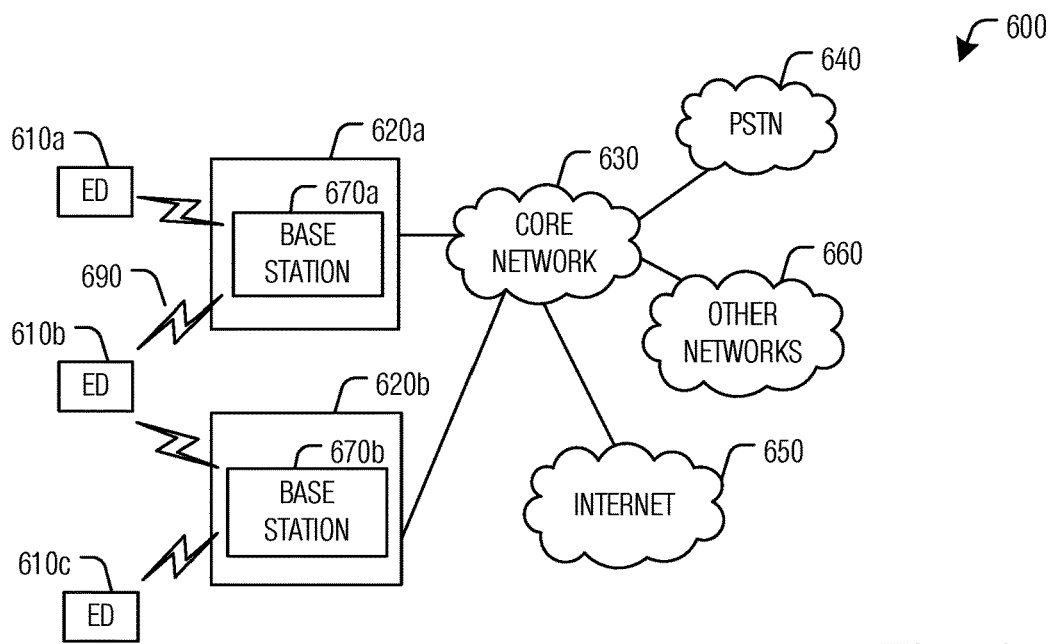
FIG. 6 illustrates an example communication system according to example embodiments presented herein.

FIG. 6 illustrates an example communication system 600. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 600 includes electronic devices (ED) 610a-610c, radio access networks (RANs) 620a-620b, a core network 630, a public switched telephone network (PSTN) 640, the Internet 650, and other networks 660. While certain numbers of these components or elements are shown in FIG. 6, any number of these components or elements may be included in the system 600.

The EDs 610a-610c are configured to operate or communicate in the system 600. For example, the EDs 610a-610c are configured to transmit or receive via wireless or wired communication channels. Each ED 610a-610c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 620a-620b here include base stations 670a-670b, respectively. Each base station 670a-670b is configured to wirelessly interface with one or more of the EDs 610a-610c to enable access to the core network 630, the PSTN 640, the Internet 650, or the other networks 660. For example, the base stations 670a-670b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 610a-610c are configured to interface and communicate with the Internet 650 and may access the core network 630, the PSTN 640, or the other networks 660.

In the embodiment shown in FIG. 6, the base station 670a forms part of the RAN 620a, which may include other base stations, elements, or devices. Also, the base station 670b forms part of the RAN 620b, which may include other base stations, elements, or devices. Each base station 670a-670b operates to transmit or receive wireless signals within a particular geographic region or area, sometimes referred to as a "cell." In some embodiments, multiple-input multiple-output (MIMO) technology may be employed having multiple transceivers for each cell.

The base stations 670a-670b communicate with one or more of the EDs 610a-610c over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 620a-620b are in communication with the core network 630 to provide the EDs 610a-610c with voice, data, application, Voice over Internet Protocol (VoIP), or other services. Understandably, the RANs 620a-620b or the core network 630 may be in direct or indirect communication with one or more other RANs (not shown). The core network 630 may also serve as a gateway access for other networks (such as the PSTN 640, the Internet 650, and the other networks 660). In addition, some or all of the EDs 610a-610c may include functionality for communicating with different wireless networks over different wireless links using different wireless technologies or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

Figure 7A:
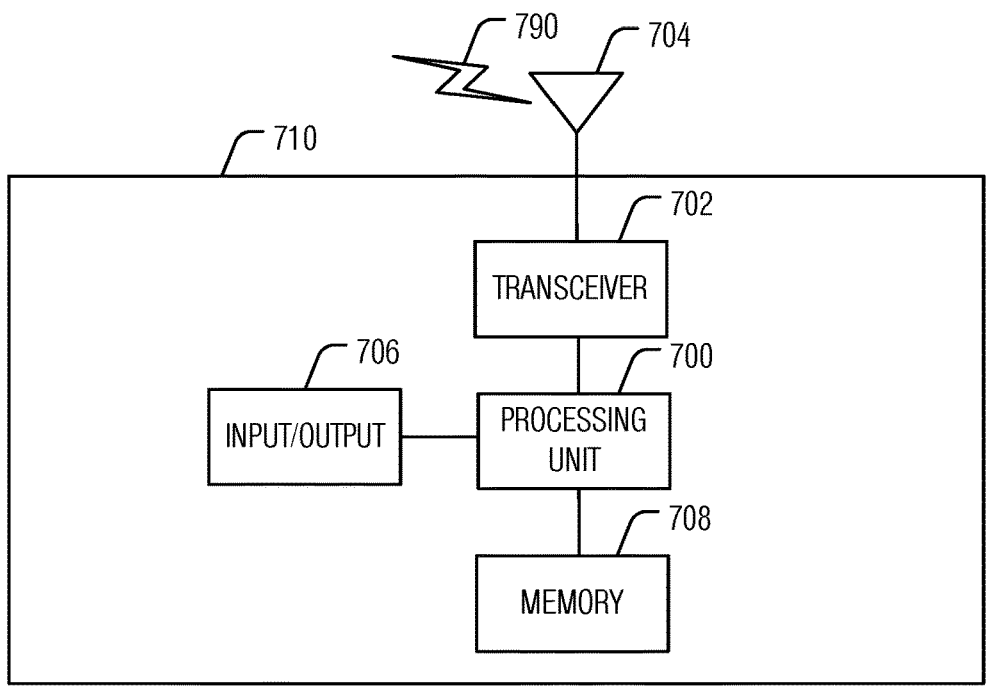
FIGS. 7A and 7B illustrate example devices that may implement the methods and teachings according to this disclosure.
Figure 7B:
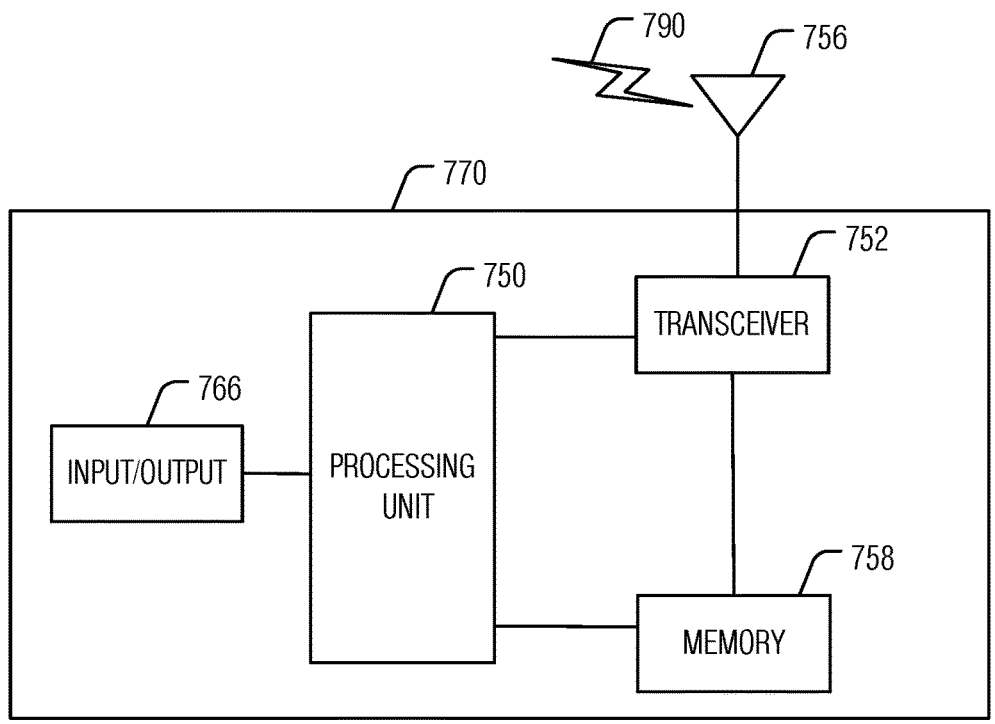

FIGS. 7A and 7B illustrate example devices that may implement the methods and teachings according to this disclosure. In particular, FIG. 7A illustrates an example ED 710, and FIG. 7B illustrates an example base station 770. These components could be used in the system 600 or in any other suitable system.

As shown in FIG. 7A, the ED 710 includes at least one processing unit 700. The processing unit 700 implements various processing operations of the ED 710. For example, the processing unit 700 could perform signal coding, data processing, power control, input/output processing, or any other functionality enabling the ED 710 to operate in the system 600. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 710 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission or processing signals received wirelessly or by wire. Each antenna 704 includes any suitable structure for transmitting or receiving wireless or wired signals. One or multiple transceivers 702 could be used in the ED 710, and one or multiple antennas 704 could be used in the ED 710. Although shown as a single functional unit, a transceiver 702 could also be implemented using at least one transmitter and at least one separate receiver.

The ED 710 further includes one or more input/output devices 706 or interfaces (such as a wired interface to the Internet 650). The input/output devices 706 facilitate interaction with a user or other devices (network communications) in the network. Each input/output device 706 includes any suitable structure for providing information to or receiving information from a user, such as a speaker, microphone, keypad, keyboard, display, or touch screen, including network interface communications.

In addition, the ED 710 includes at least one memory 708. The memory 708 stores instructions and data used, generated, or collected by the ED 710. For example, the memory 708 could store software or firmware instructions executed by the processing unit(s) 700 and data used to reduce or eliminate interference in incoming signals. Each memory 708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 770 includes at least one processing unit 750, at least one transceiver 752, which includes functionality for a transmitter and a receiver, one or more antennas 756, at least one memory 758, and one or more input/output devices or interfaces 766. A scheduler, which would be understood by one skilled in the art, is coupled to the processing unit 750. The scheduler could be included within or operated separately from the base station 770. The processing unit 750 implements various processing operations of the base station 770, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more EDs or other devices. Each transceiver 752 further includes any suitable structure for processing signals received wirelessly or by wire from one or more EDs or other devices. Although shown combined as a transceiver 752, a transmitter and a receiver could be separate components. Each antenna 756 includes any suitable structure for transmitting or receiving wireless or wired signals. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile or non-volatile storage and retrieval device(s). Each input/output device 766 facilitates interaction with a user or other devices (network communications) in the network. Each input/output device 766 includes any suitable structure for providing information to or receiving/providing information from a user, including network interface communications.

Figure 8:
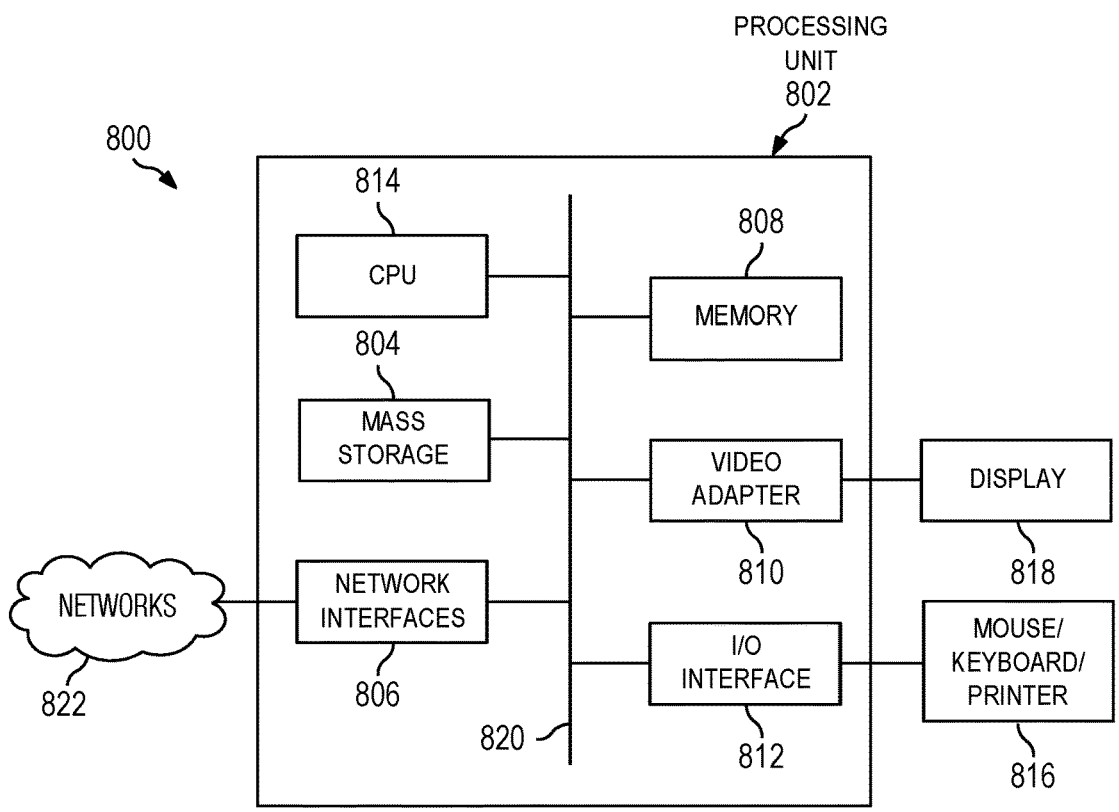
FIG. 8 is a block diagram of a computing system that may be used for implementing the devices and methods disclosed herein.

FIG. 8 is a block diagram of a computing system 800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 802. The processing unit includes a central processing unit (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processing unit 802. As illustrated, examples of input and output devices include a display 818 coupled to the video adapter 810 and a mouse, keyboard, or printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for an external device.

The processing unit 802 also includes one or more network interfaces 806, which may comprise wired links, such as an Ethernet cable, or wireless links to access nodes or different networks. The network interfaces 806 allow the processing unit 802 to communicate with remote units via the networks. For example, the network interfaces 806 may provide wireless communication via one or more transmitters/transmit antennas and one or more receivers/receive antennas. In an embodiment, the processing unit 802 is coupled to a local-area network 822 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a measuring unit or module, a selecting unit or module, or a grouping unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a user equipment (UE), the method comprising:
measuring, by the UE, beamformed reference signals;
selecting, by the UE, one or more beams in accordance with the measured beamformed reference signals; and
determining, by the UE, that an uplink transmit power of the UE on a subset of the one or more beams is limited by emission criteria, and based thereon,
transmitting, by the UE, a beam report indicating the one or more beams and an uplink transmit power limitation.

2. The method of claim 1, wherein the beamformed reference signals are measured during a beam management (BM) procedure.

3. The method of claim 1, wherein the beam report comprises a non-group-based report.

4. The method of claim 3, wherein an indicator of the uplink transmit power limitation indicates that the subset of the one or more beams are impacted by the emission criteria.

5. The method of claim 3, wherein the beam report further indicates a power backoff value subject to a maximum transmission power or a maximum transmit power of the UE subject to the emission criteria.

6. The method of claim 1, wherein the beam report comprises a group-based report.

7. The method of claim 6, further comprising grouping, by the UE, the subset of the one or more beams in accordance with the emission criteria.

8. The method of claim 6, wherein the beam report further indicates a power backoff value or a maximum uplink transmit power of the UE subject to the emission criteria.

9. The method of claim 1, wherein the beam report is transmitted in a channel state information (CSI) report.

10. The method of claim 1, wherein the beamformed reference signals comprise at least one of a channel state information reference signal (CSI-RS) or a synchronization signal block (SSB).

11. The method of claim 1, wherein the emission criteria comprises electromagnetic field emission criteria published by at least one of the International Commission and Non-Ionizing Radiation Protection (ICNIRP), the Federal Communication Commission (FCC), or the Institute of Electrical and Electronics Engineers (IEEE).

12. A method implemented by an access node, the method comprising:
transmitting, by the access node, beamformed reference signals;

receiving, by the access node from a user equipment (UE), a beam report indicating one or more beams and an uplink transmit power limitation; and selecting, by the access node, one or more beam pair links (BPLs) from the one or more beams in accordance with the beam report.

13. The method of claim 12, wherein the beam report is received in a channel state information (CSI) report.

14. The method of claim 12, wherein the beamformed reference signals comprise at least one of a channel state information reference signal (CSI-RS) or a synchronization signal block (SSB).

15. The method of claim 12, wherein the beam report comprises a non-group-based report.

16. The method of claim 15, wherein an indicator of the uplink transmit power limitation indicates that a subset of the one or more beams are impacted by emission criteria or a power backoff value subject to a maximum transmission power.

17. The method of claim 12, wherein the beam report comprises a group-based report.

18. The method of claim 12, wherein selecting the one or more BPLs comprises selecting the one or more BPLs in accordance with an indicator of the one or more beams and an indicator of the uplink transmit power limitation.

19. A user equipment (UE) comprising:
a non-transitory memory storage comprising instructions; and
one or more processors in communication with the non-transitory memory storage, wherein the one or more processors execute the instructions to:
measure beamformed reference signals,
select one or more beams in accordance with the measured beamformed reference signals, and
determining, by the UE, that an uplink transmit power of the UE on a subset of the one or more beams is limited by emission criteria, and based thereon, transmitting, by the UE, a beam report indicating the one or more beams and an uplink transmit power limitation.

20. The UE of claim 19, wherein the beam report comprises a non-group-based report.

21. The UE of claim 19, wherein an indicator of the uplink transmit power limitation indicates that the subset of the one or more beams are impacted by the emission criteria.

22. The UE of claim 21, wherein the one or more processors further execute the instructions to determine that the uplink transmit power of the UE according to open loop power control is unachievable, and based thereon, determine that the uplink transmit power of the UE is limited to meet emission criteria.

23. The UE of claim 19, wherein the beam report comprises a group-based report.

24. The UE of claim 19, wherein the one or more processors further execute the instructions to group the one or more beams in accordance with the emission criteria.

25. An access node comprising:
a non-transitory memory storage comprising instructions; and
one or more processors in communication with the non-transitory memory storage, wherein the one or more processors execute the instructions to:
transmit beamformed reference signals,
receive, from a user equipment (UE), a beam report indicating one or more beams and an uplink transmit power limitation, and
select one or more beam pair links (BPLs) from the one or more beams in accordance with the beam report.

26. The access node of claim 25, wherein the beam report comprises a non-group-based report.

27. The access node of claim 25, wherein the beam report comprises a group-based report.

* * * * *